Dec. 12, 1961 H. J. MUMMA 3,012,693
MACHINE FOR HANDLING EGGS
Original Filed June 1, 1953 13 Sheets-Sheet 1
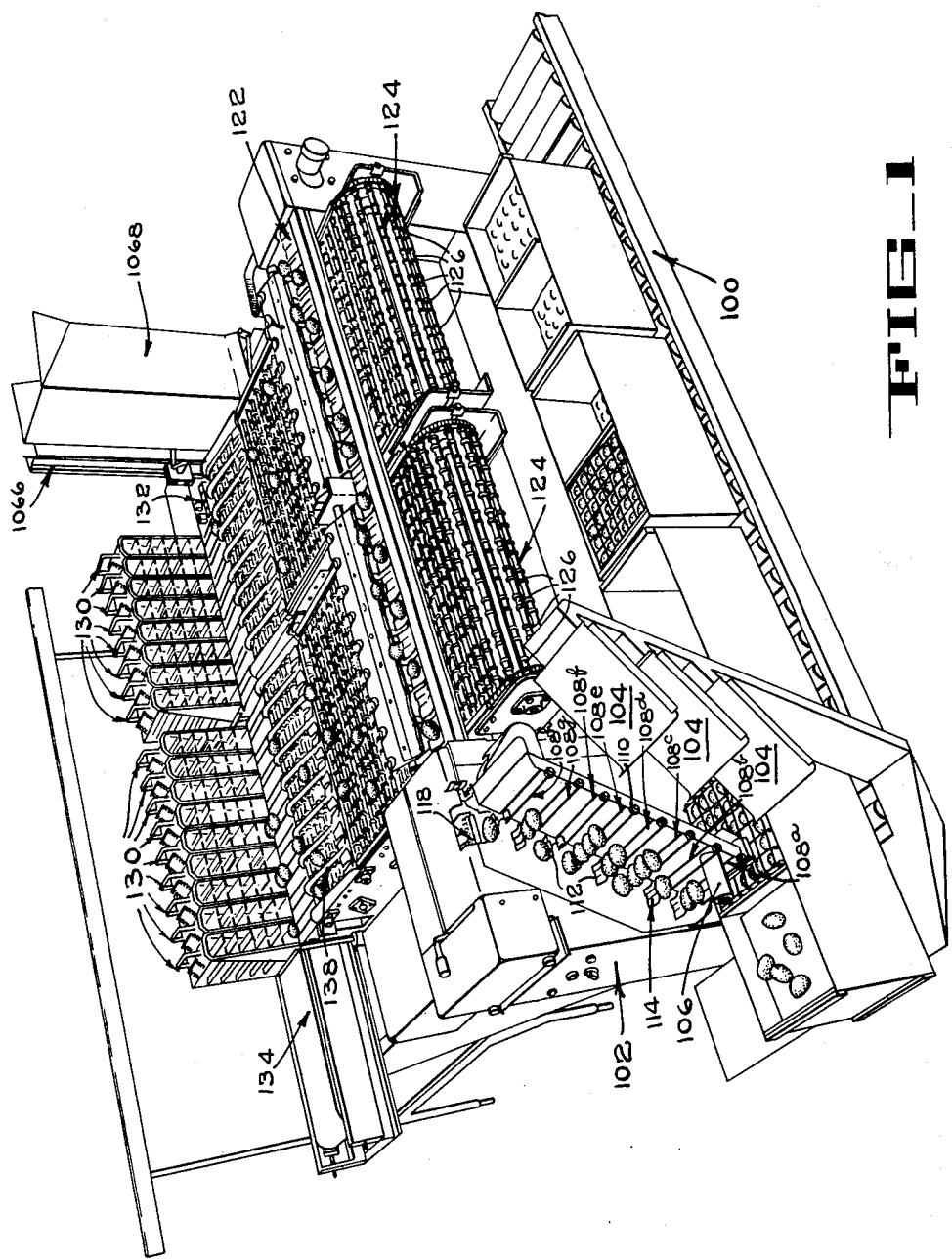
FIG_1
INVENTOR
HAROLD J. MUMMA
BY Hans G. Hoffmeister
ATTORNEY

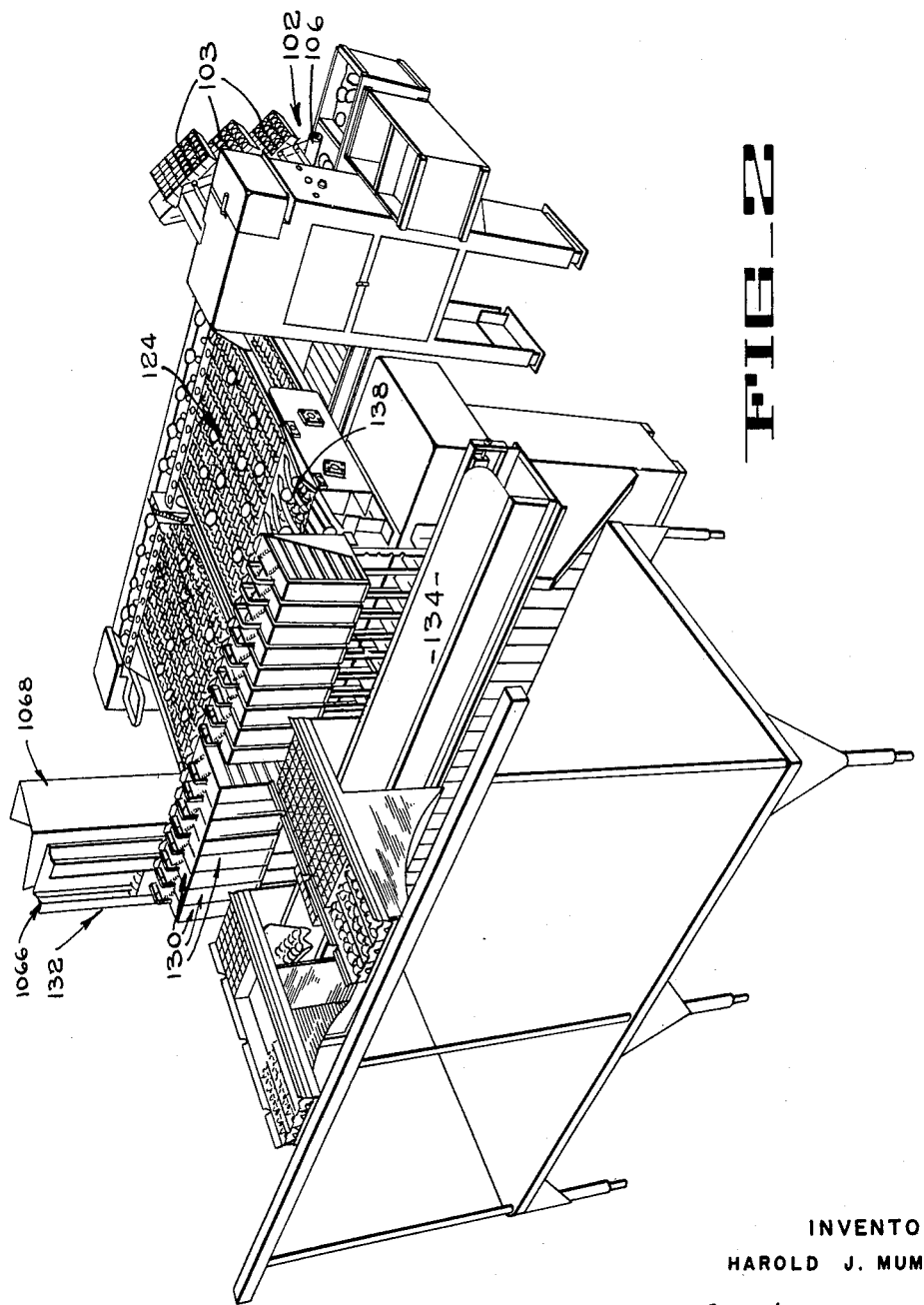

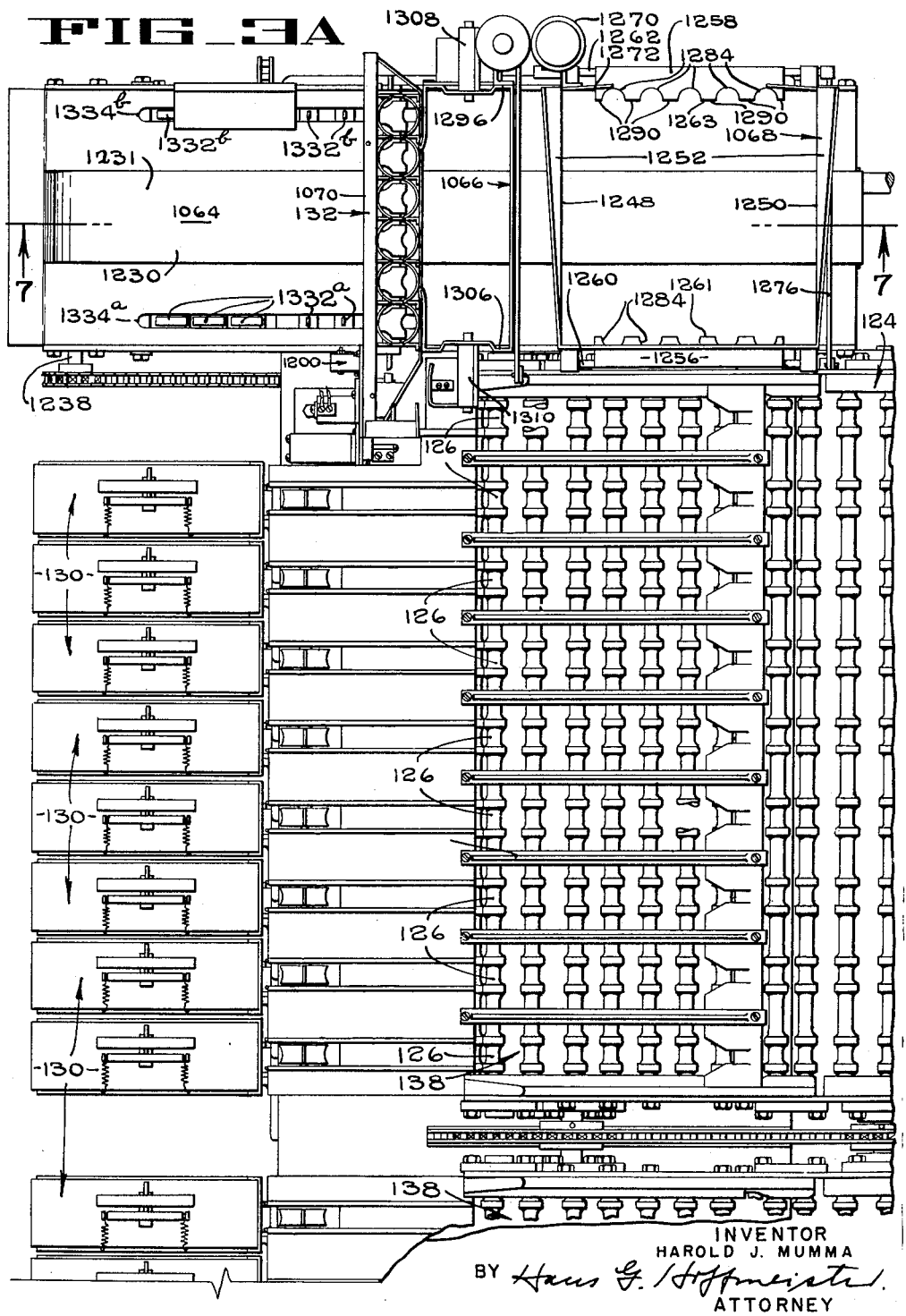

Dec. 12, 1961 H. J. MUMMA 3,012,693
MACHINE FOR HANDLING EGGS
Original Filed June 1, 1953 13 Sheets-Sheet 4
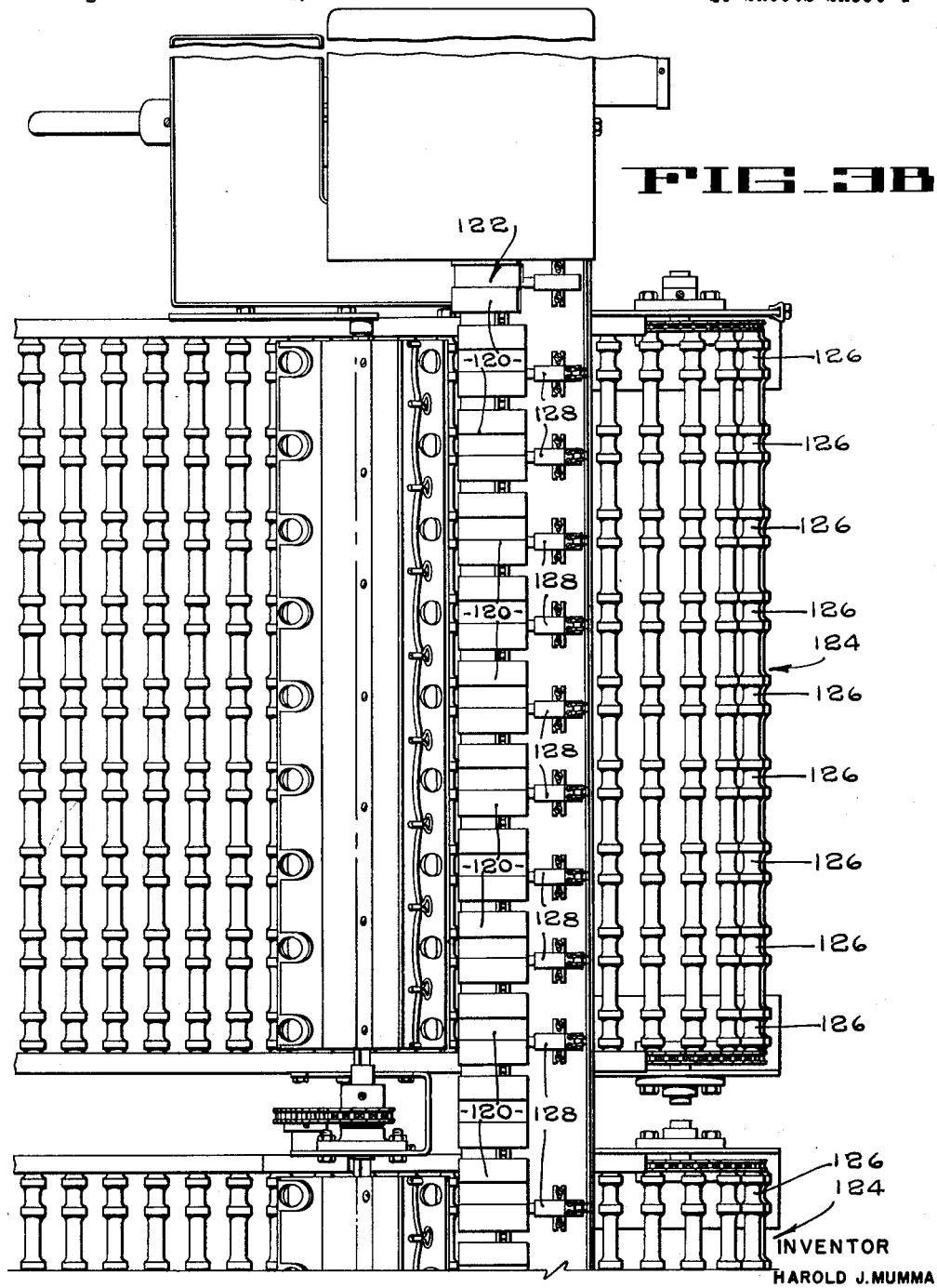
INVENTOR
HAROLD J. MUMMA
BY
ATTORNEY Dec. 12, 1961     H. J. MUMMA     3,012,693
MACHINE FOR HANDLING EGGS
Original Filed June 1, 1953     13 Sheets-Sheet 5
FIG_3C
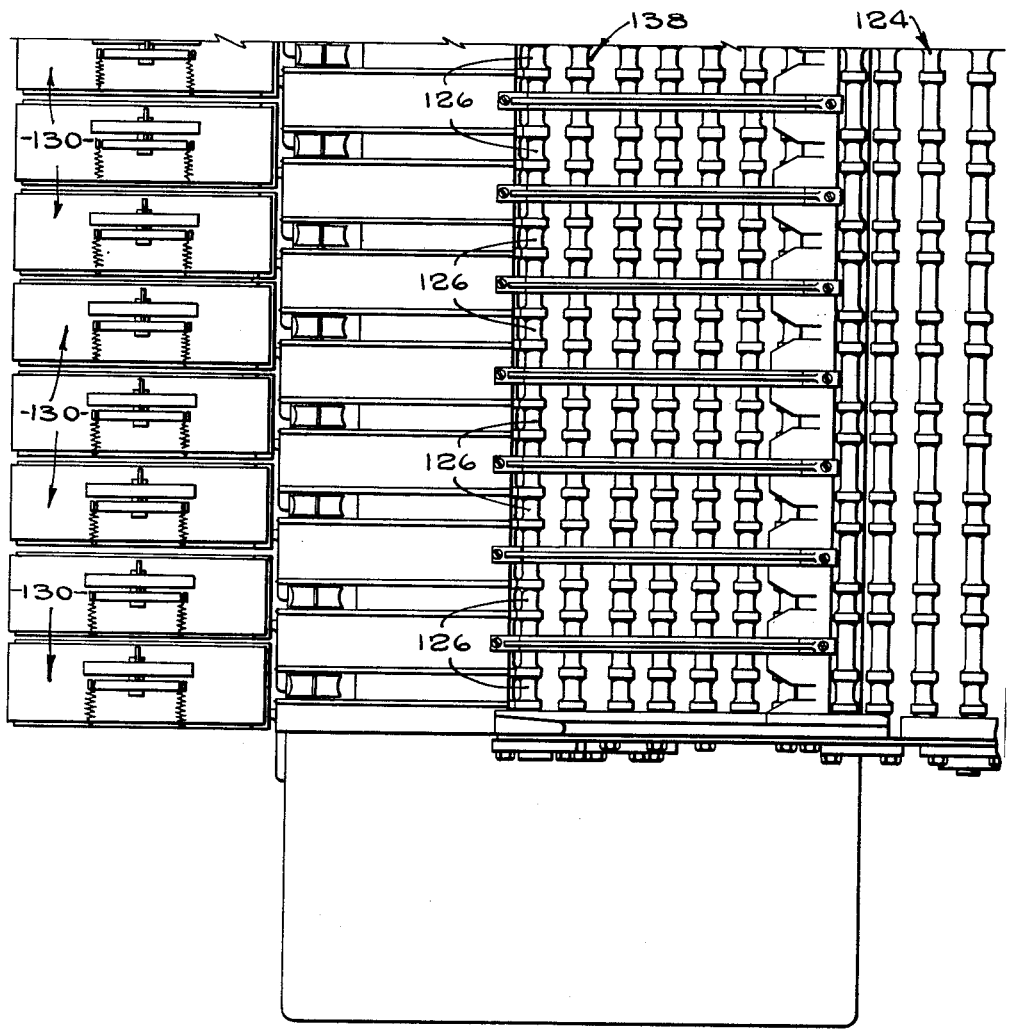
INVENTOR
HAROLD J. MUMMA
BY
ATTORNEY

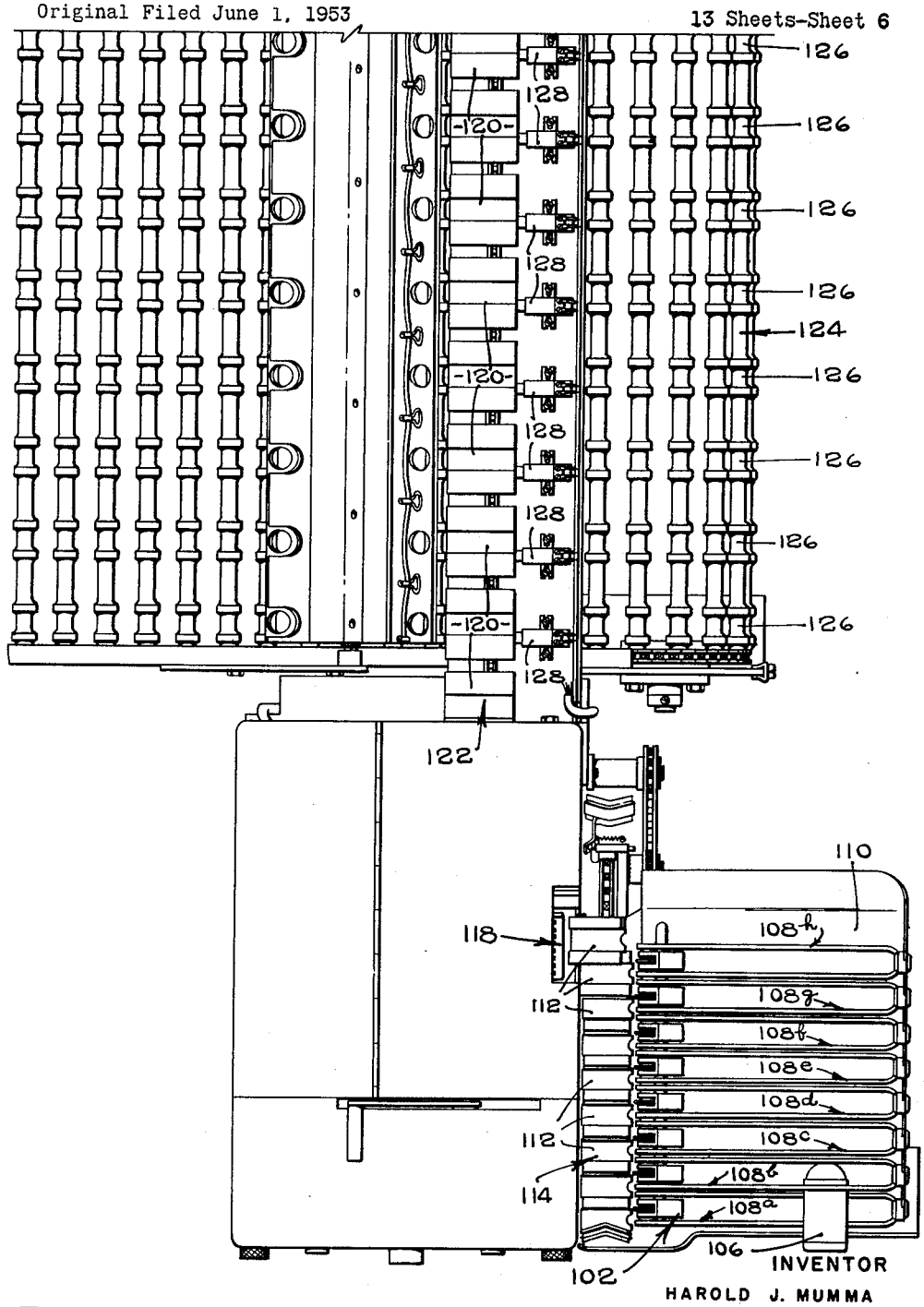

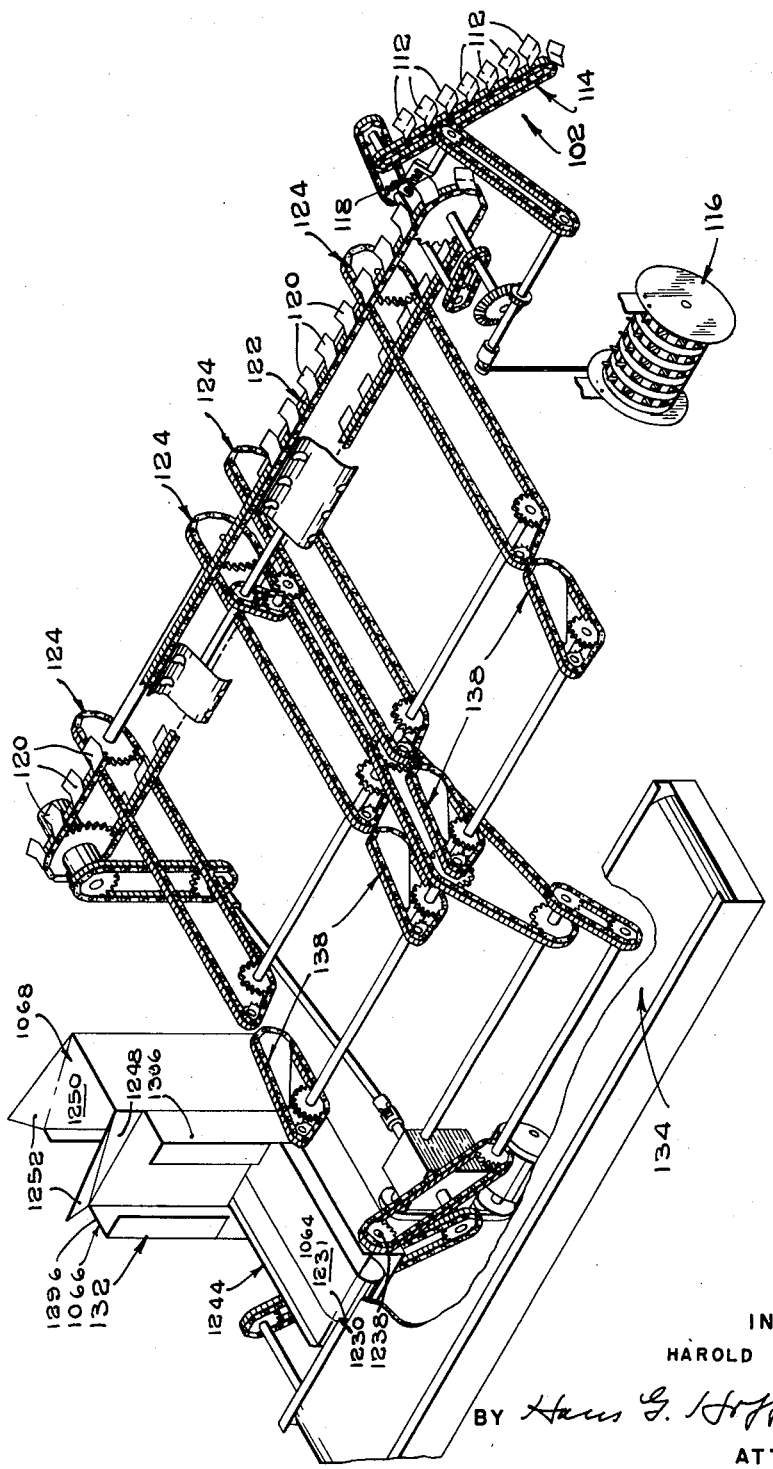

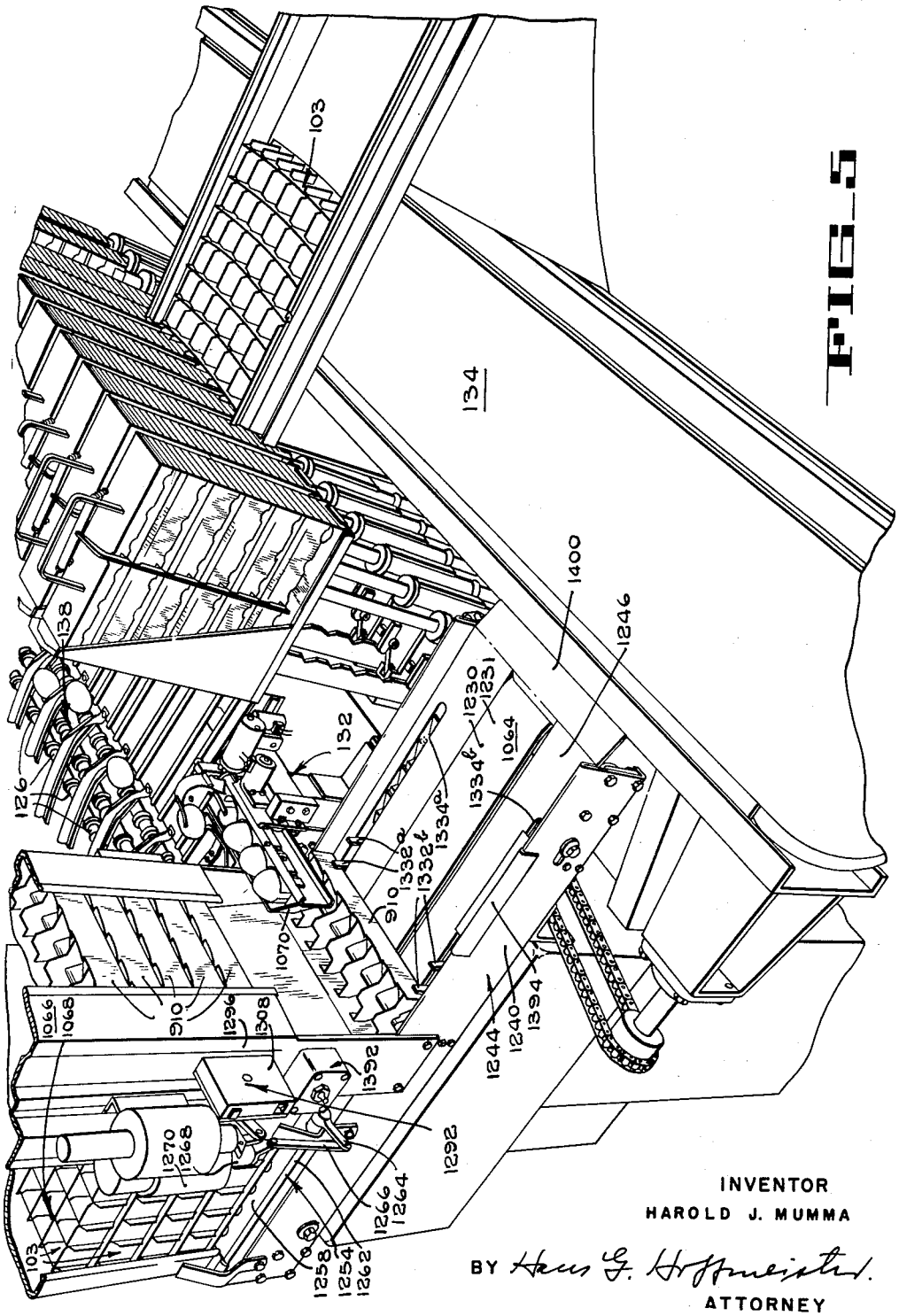

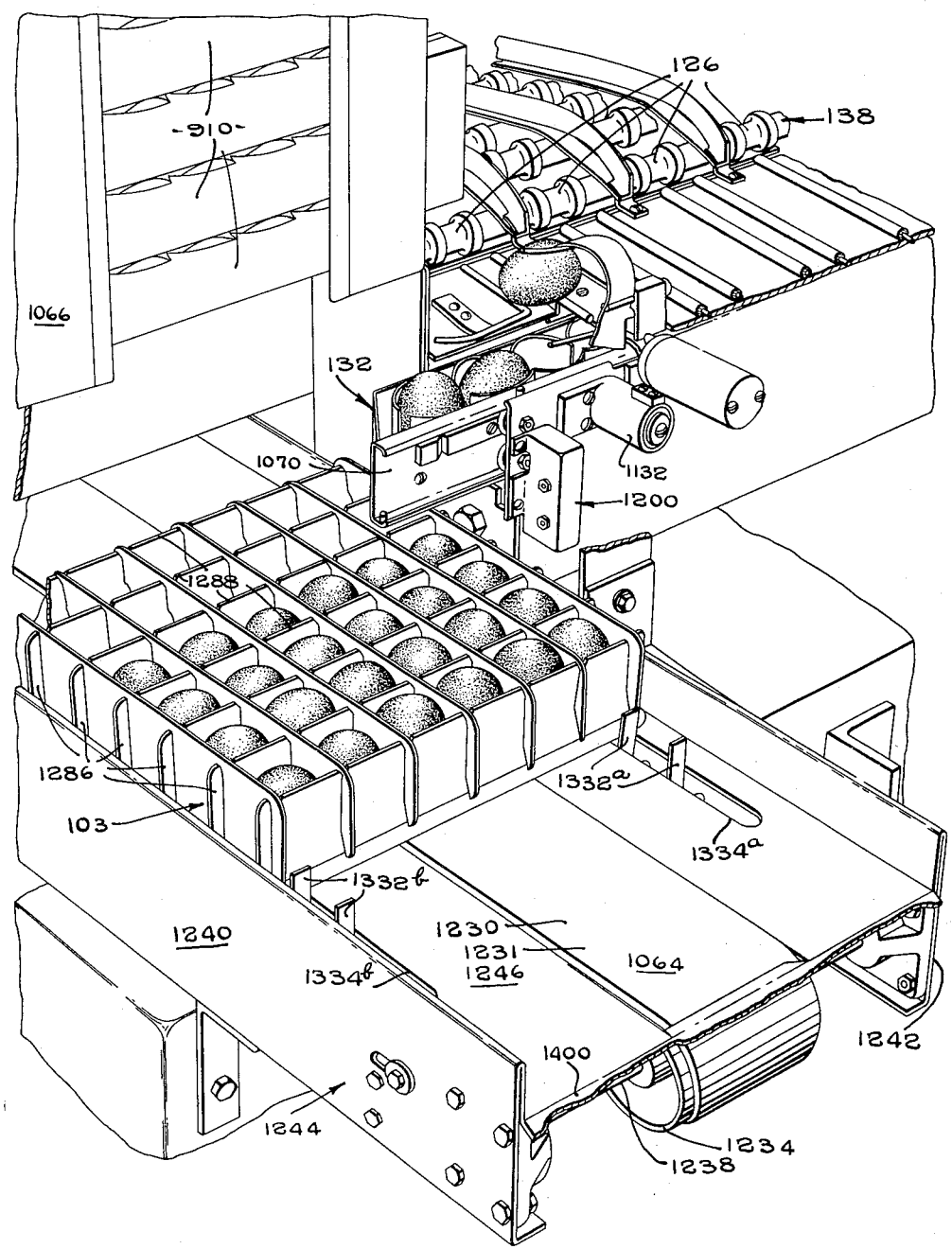

Dec. 12, 1961   H. J. MUMMA   3,012,693
MACHINE FOR HANDLING EGGS
Original Filed June 1, 1953   13 Sheets-Sheet 10
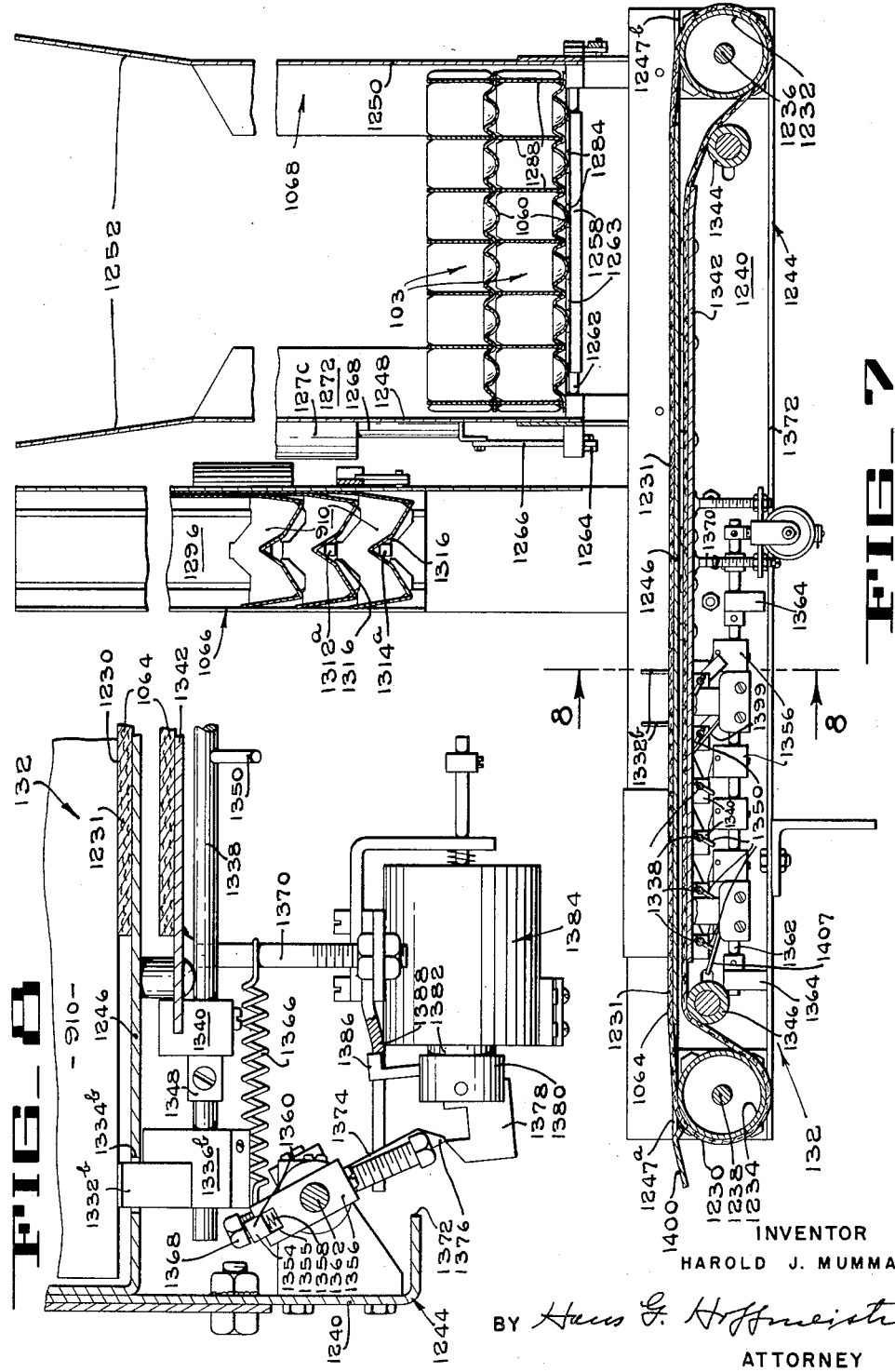
INVENTOR
HAROLD J. MUMMA
BY Hans G. Hoffmeister
ATTORNEY

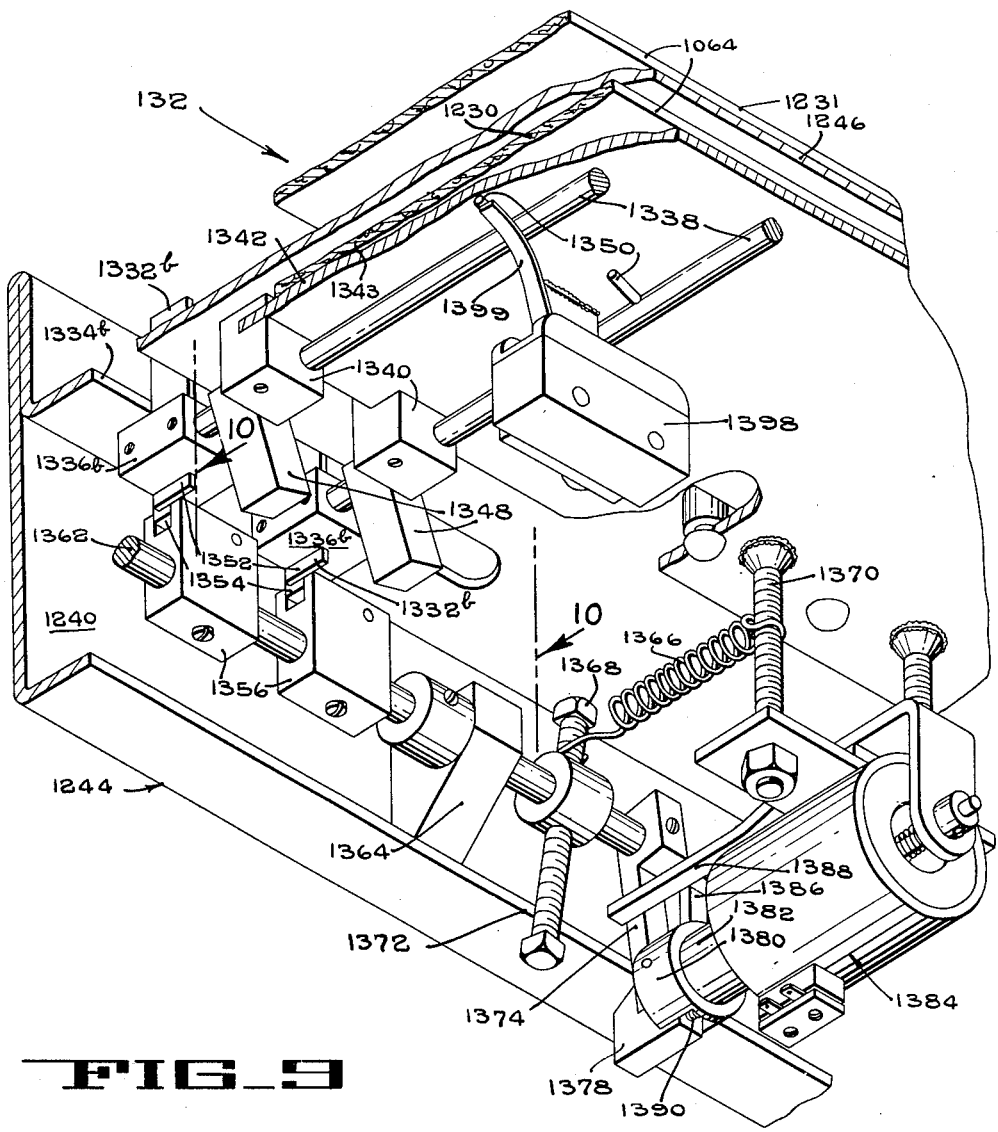

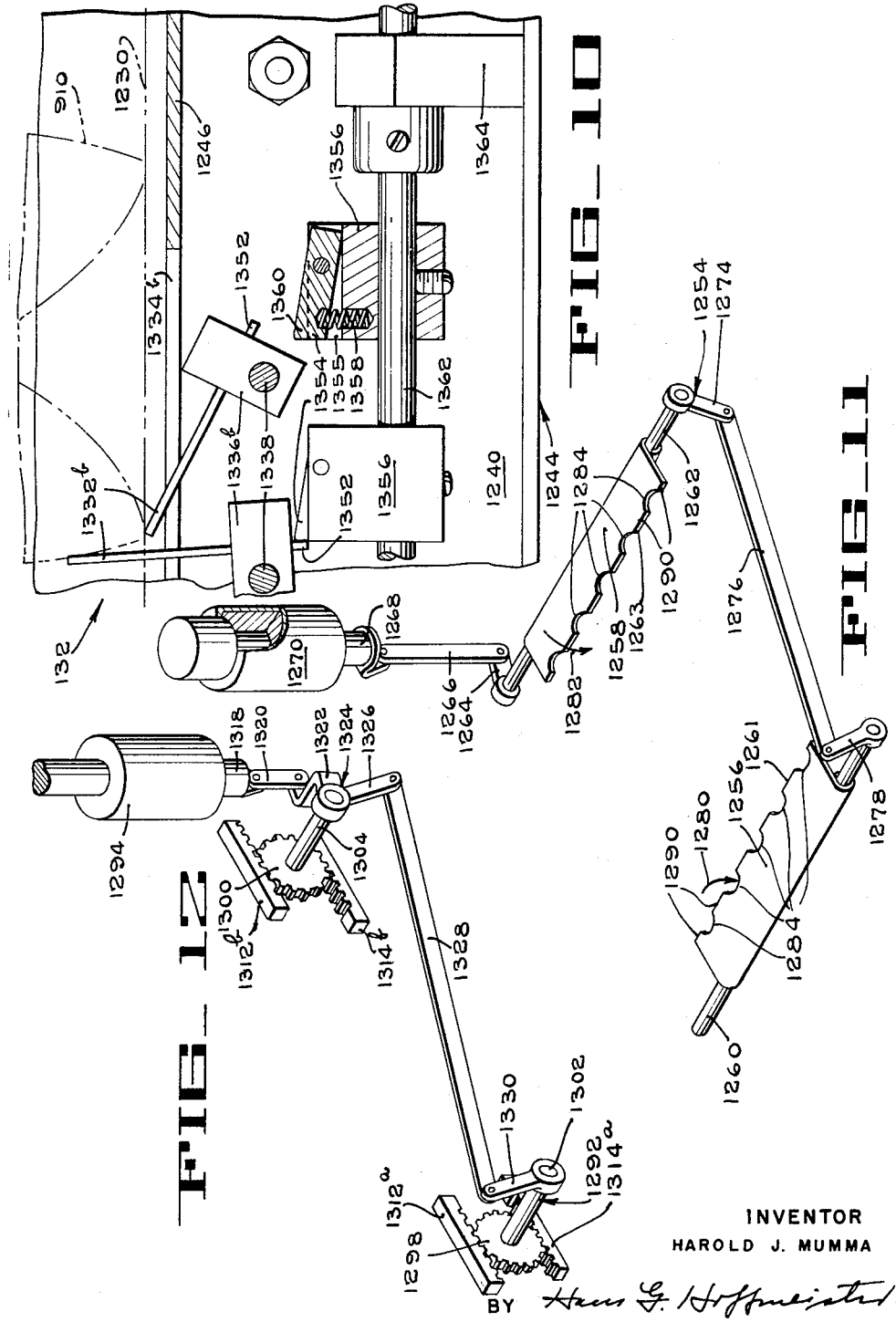

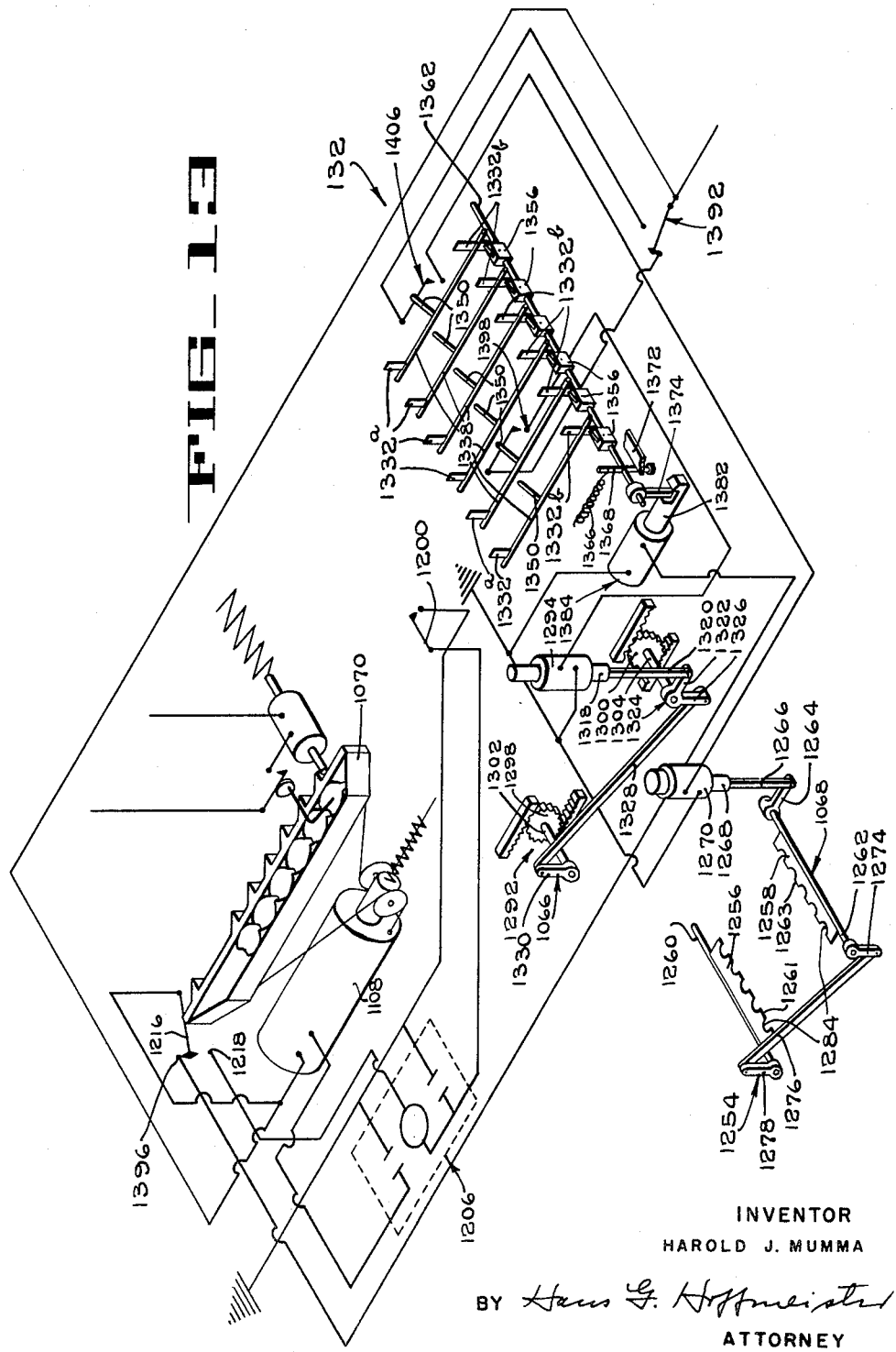

United States Patent Office

3,012,693
Patented Dec. 12, 1961

3,012,693
MACHINE FOR HANDLING EGGS
Harold J. Mumma, Riverside, Calif., assignor to FMC Corporation, a corporation of Delaware
Original application June 1, 1953, Ser. No. 358,621. Divided and this application Nov. 15, 1956, Ser. No. 622,419
2 Claims. (Cl. 221—223)

The present invention relates to machines and apparatus for handling eggs. More particularly, the present invention relates to machines and apparatus which facilitate the packing of eggs into cartons or cases for shipment to distributors and consumers.

This application is a division of my copending application, U.S. Serial No. 358,621, filed June 1, 1953, for a Machine for Handling Eggs.

An object of the present invention is to provide mechanism operable to facilitate the packing of eggs into cartons or cardboard grids.

Another object is to provide a feed mechanism for egg containers that deposits one container at a time onto a conveyor.

Another object is to provide a container feed mechanism for releasing containers individually from a magazine containing a stack of superposed containers.

These and other objects and advantages of the present invention will become apparent from the following description of the accompanying drawings wherein:

FIG. 1 is a perspective of the total egg handling machine of the invention viewed from a point in front and to the right of the feed end thereof.

FIG. 2 is another perspective of the total egg handling machine viewed from a point in front and to the right of the egg discharge end thereof.

FIGS. 3A, 3B, 3C and 3D are the four quarters of a plan view of the total machine.

FIG. 4 is a fragmentary schematic perspective illustrating the various power trains by means of which the movable components of the machine are driven from a common source of rotary power.

FIG. 5 is a fragmentary perspective illustrating a carton packing station provided at the egg discharge end of the machine.

FIG. 6 is yet another perspective illustrating the manner in which the carton packing mechanism of the invention fills an egg container of larger size than the two row cartons illustrated in FIG. 5.

FIG. 7 is a vertical longitudinal section through the carton supply conveyor of the carton packing station and through two selectively operable carton supply magazines arranged above said conveyor, said section being taken along line 7—7 of FIG. 3A.

FIG. 8 is a fragmentary vertical cross section through the carton supply conveyor and the control mechanism associated therewith, said section being taken along line 8—8 of FIG. 7.

FIG. 9 is a fragmentary perspective of the carton supply conveyor and associated control mechanism taken from a point below said conveyor.

FIG. 10 is a fragmentary longitudinal section through the carton supply conveyor and associated control mechanism taken along line 10—10 of FIG. 9.

FIGS. 11 and 12 are fragmentary perspectives of control mechanisms for releasing cartons from the two selectively operable carton supply magazines illustrated in FIG. 7.

FIG. 13 is a diagram illustrating the electrical circuits of the carton packing station and the manner in which they correlate the operation of the egg collecting carriage, the carton release mechanism and the control mechanism of the carton supply conveyor.

The egg handling machine of the invention (FIGS. 1 and 2) comprises a supply conveyor 100 which may have the form of a slightly inclined roller conveyor, whereupon cases or crates with eggs are delivered to the candling station 102. At the candling station, the operator takes the eggs from the cases or crates, checks them first for external appearance and places those that are deformed, excessively dirty or broken into the pockets of cardboard grids 103 on special trays 104 that are located at his right side. Those found to be of satisfactory external appearance, he views against a light beam emitted from a suitable electric torch 106 and places them according to their color and internal quality upon the proper racks or shelves 108 of a reclining grading board 110 that has eight such shelves or racks 108a, 108b, 108c, 108d, 108e, 108f, 108g and 108h in superposed relation. From the racks or shelves 108 which are laterally inclined, the eggs slide onto the cups 112 of a single file elevator 114 while actuating electric mechanisms that register the quality of every egg according to the rack or shelf from which it is supplied to the conveyor on a rotary memory device 116 (FIG. 4), that moves in synchronism with the elevator 114 and which possesses quality recording members corresponding to every one of the cups 112 that pass by, and may receive an egg from the racks or shelves of the grading board 110. The elevator 114 lifts the eggs successively to the level of and delivers them into a weighing mechanism 118 which weighs each egg and registers its weight by electrical impulses on the memory device 116 with aid of weight recording members thereof that are aligned with the previously mentioned quality recording numbers. From the weighing mechanism 118 the eggs are transferred onto cups 120 carried by the elongated horizontal run of a single file conveyor 122 which passes at right angles over another conveyor 124 that comprises as many parallel lanes 126 as there are different quality/weight classification groups provided for in the machine. The cups 120 on the horizontal run of the single file conveyor 122 advance in synchronism with both the feed elevator 114 and the memory device 116; hence, as an egg passes from the aforementioned feed elevator 114 onto the weighing mechanism 118 and from there onto a cup 120 of the single file conveyor 122, the cup 120 on the latter conveyor that receives the particular egg steps into the synchronous relation with the quality and weight recording members of the memory device 116 which, up to this point, was held by the elevator cup 112 that passed the egg to the weighing mechanism.

Above each classification lane 126 of the multi-lane conveyor 124, mechanism is provided in the form of solenoids 128 (FIGS. 3B and 3D) that are operable to tip the cups 120 of the single file conveyor 122 as they pass above said classification lanes so as to deliver the eggs from said cups into selected ones of said classification lanes. Energization of each of said solenoids 128 (FIGS. 3B and 3D) is arranged to require the simultaneous closure of at least two series-connected normally open switches whose position may be adjustable relative to the hereinbefore mentioned memory device and which may be closed depending upon their position by selected ones of the hereinbefore mentioned quality and weight recording members of said device whenever a cup carrying an egg of the selected quality and weight combination passes over a particular preselected lane 126 of the classification conveyor 124. Thus, as the single file conveyor 122 carries the eggs over the various parallel lanes 126 of the classification conveyor 124, it distributes said eggs under control of the memory device into the proper classification lanes of said conveyor 124 so that each of said lanes will receive only eggs of predetermined quality and weight combinations.

The classification conveyor 124 may be arranged to feed the segregated eggs to egg accumulators 130 which are provided at the end of each classification lane and which operate to arrange the eggs in superposed tiers or rows. Alternatively, the classification lanes of transverse conveyor 124 may be arranged to feed the eggs into an automatic carton filling mechanism 132, and the automatically filled cartons are then delivered onto the upper run of a take-off conveyor 134 extending along the discharge end of the classification lanes 126 as best shown in FIG. 2.

Before eggs are packed, it may be desirable to subject them to a spray of oil, an operation known as oiling, which is intended to preserve their freshness. In the particular embodiment of the invention illustrated in FIGS. 1, 2, 3A, 3B, 3C and 3D, an additional conveyor 138, having as many classification lanes as the classification conveyor 124, may therefore be interposed between the end of said classification conveyor and the packing mechanisms to pass the segregated eggs through an oiling chamber (not shown) before they are fed into the packing mechanisms. In this manner, the oil deposited upon the conveyor during the egg oiling operation is confined to the limited space occupied by the oiling conveyor instead of being spread all over the floor space of the total egg handling machine.

Seventeen of the eighteen classification lanes formed by the conveyors 124 and 138 are provided with egg accumulating units 130 of the type described in my aforementioned copending application which facilitate the packing of eggs of the same classification group into cartons in the manner explained hereinbefore. In the exemplary embodiment of the invention illustrated in the accompanying drawings, the last or eighteenth of the classification lanes, however, is arranged to feed its eggs into a mechanism 132 that may be operated to pack the eggs directly into the customary double row cartons 910 (FIG. 7) or into cardboard grids 103 placed upon cardboard base plates 1060, such as are used to pack large quantities of eggs into boxes or cases. Said egg packing mechanism 132 comprises a conveyor 1064 (FIG. 5) arranged to deliver cartons or cardboard grids from selectively operable supply magazines 1066 and 1068, respectively (FIG. 7), into an egg receiving position below a transversely movable egg accumulating carriage 1070 that receives the eggs individually from the eighteenth classification lane and moves laterally across the carton supply conveyor into vertical alignment with a carton or cardboard grid on said conveyor underneath. When in said position it discharges the eggs into a pocket row of the carton or cardboard grid whereupon it returns to its initial position laterally removed from the conveyor and initiates operation of mechanism that permits the carton or cardboard grid upon the conveyor to advance by a distance equal to the width of an egg pocket row so as to place the next row of pockets below the path of the carriage across the carton supply conveyor. The egg accumulating carriage 1070 is described in detail in my aforementioned copending application.

The carton feed conveyor 1064 comprises an endless belt 1230 whose upper run 1231 extends horizontally below the path of the egg collecting carriage 1070 as shown in FIG. 3A. Said belt as shown in FIG. 7 is trained about a pair of drums 1232 and 1234 that are mounted upon an idler shaft 1236 and a drive shaft 1238, respectively. Said shafts are rotatably supported in the side panels 1240 and 1242 of a channel structure 1244 that is suitably supported from the machine frame in a position parallel and adjacent to the oiling conveyor (FIG. 6). Said side panels are formed at either side of a horizontal panel 1246 that is situated above the drums 1232 and 1234 and which is of a transverse width about equal to the cartons or cardboard grids to be handled by the described mechanism. The upper run 1231 of the endless belt extends through a suitable slot 1247a and a recess 1247b, respectively, in said horizontal panel and is supported upon said panel as best shown in FIG. 7.

Mounted upon the side panels 1240 and 1242 above the upper run 1231 of belt 1230 at areas in front of the transverse path of the egg accumulating carriage when viewed in the direction of movement of said upper run, are the two hereinbefore mentioned supply magazines 1066 and 1068. The latter one is of a width and breadth sufficient to snugly receive the hereinbefore mentioned square-shaped cardboard bases 1060 with cardboard grids 103 resting loosely thereon (FIG. 6) and the upper ends of the side walls 1248 and 1250 of said magazine 1068 are preferably flared outwardly as shown at 1252 in FIG. 7 to facilitate insertion of said cardboard bases and said grids. The open bottom end of the magazine 1068 is normally blocked by a gate mechanism 1254 that is adapted upon actuation to pass a single one of the base plates 1060 with one cardboard grid 103 resting thereon onto the upper run 1231 of the endless conveyor belt underneath. Having reference to FIGS. 7 and 11, said gate mechanism comprises a pair of narrow shelves 1256 and 1258 that are rigidly mounted with one of their long edges upon horizontal spindles 1260 and 1262, respectively. Said spindles are rotatably supported in the side walls of the magazine 1068 near the front and rear edges thereof, and are normally held in a rotary position wherein their respective shelves are horizontally disposed and project with their free edges 1261 and 1263 toward each other and into the interior of the magazine so that they may effectively block the bottom end of the magazine and support any stack of superposed base plates and cardboard grids within said magazine.

Means are provided, that may be operated to dip the two shelves 1256 and 1258 simultaneously for a brief moment so that they may deliver the lowermost base plate with its cardboard grid resting thereon onto the conveyor belt underneath. For this purpose, the spindle 1262 is rigidly secured at one of its ends to a short arm 1264 whose free end is pivoted to a substantially vertically extending link 1266 that in turn is pivotally secured to the normally downwardly projected armature 1268 of a vertically positioned solenoid 1270 suitably supported from a front flange 1272 of the side wall 1248 of magazine 1068 (FIG. 5). At its opposite end the spindle 1262 is likewise provided with a short arm 1274 which is downwardly directed and which is pivotally connected through an elongated interponent 1276 to another short arm 1278 that extends upwardly from, and is rigidly secured to the corresponding end of the other spindle 1260. Upon energization of the solenoid 1270, when its armature 1268 is retracted, both the shelves 1256 and 1258 dip downwardly as indicated by the arrows at 1280 and and 1282 in FIG. 11. When this occurs the lowermost base plate 1060 in the magazine is released and the whole stack of baseplates 1060 and cardboard grids 103 drop within the magazine upon the conveyor belt 1230. The solenoid 1270, however, is energized for only a very brief moment, and when it is de-energized the resultant return of its armature to its downwardly projected position returns the shelves 1256 and 1258 to their normal substantialy horizontal position. As the shelves return to their horizontal position, they engage below the next higher base plate 1060 and lift said plate together with the remaining stack of cardboard grids and base plates within the chute above the lowermost base plate and cardboard grid that remain upon the conveyor belt 1230. Lest the immediate return of the shelves 1256 and 1258 to their horizontal magazine-blocking position may crush the cardboard grid above the lowermost base plate and prevent it from fully descending with said lowermost plate, the inner edges 1261 and 1263 of said shelves may be provided with arcuate recesses 1284 corresponding to the projecting ends 1286 of the partitioning walls 1288 of the cardboard grids. Hence, the shelves 1256 and 1258, as they return above the released base plate, are unable to engage the projecting ends 1286 of the lowermost cardboard grid, and yet will effectively engage the next higher base plate with the tongues 1290 formed between their arcuate recesses 1284.

The second magazine 1066 is of smaller compass than the one described above to snugly receive a stack of the usual egg cartons 910 which hold two parallel rows of eggs each comprising six eggs. Said second magazine 1066 may be arranged to face with its open side wall in the direction of movement of the upper run 1231 of the conveyor belt 1230 as shown in FIG. 5 and is provided with a gate mechanism 1292 that normally blocks its open lower end but may be operated by energization of a solenoid 1294 supported from an end wall 1296 to release a single carton for delivery onto the conveyor belt 1230 underneath. Having reference to FIGS. 12 and 13 said carton release mechanism comprises a pair of pinions 1298 and 1300 firmly mounted upon spindles 1302 and 1304, respectively, that are rotatably supported from, and exteriorly of, the opposite end walls 1296 and 1306 of the magazine and which may be kept under suitable covers 1308 and 1310, respectively, as shown in FIG. 3A. Each of said pinions meshes with upper and lower horizontally disposed racks 1312a, 1314a and 1312b, 1314b, respectively, that may project through centrally located apertures in the end walls 1296 and 1306 of the magazine (FIG. 7). Normally the rotary position of the pinions 1298 and 1300 is such that the lower racks 1314a and 1314b are projected into the magazine where they may engage the central bottom recesses 1316 (FIG. 7) of the lowest one of the cartons 910 stacked above each other in the magazine with their lids in vertically unfolded position as shown in FIG. 7.

Means are provided in the form of the before mentioned solenoid 1294 that briefly turn both pinions in unison in such a manner that the lower racks 1314a and 1314b are withdrawn from the magazine to release the lowermost carton therein, while the upper racks 1312a and 1312b are projected into the magazine to prevent the directly succeeding carton from following suit. For this purpose, the normally downwardly projected armature 1318 of the vertically positioned solenoid 1294 is pivotally connected through a link 1320 to the upper arm 1322 of a bell crank 1324 that is firmly mounted upon the spindle 1304 of pinion 1300. The lower arm 1326 of said bell crank in turn is pivotally connected through an elongated interponent 1328 to the end of an upwardly directed arm 1330 that is firmly mounted upon the spindle 1302 of the other pinion 1298. When the solenoid 1294 is energized at a time and in a manner to be described in greater detail hereinafter, the armature 1318 thereof is retracted which turns the bell crank 1324 and hence the pinion 1300 in counterclockwise direction as viewed in FIGS. 12 and 13. This is effective to retract its lower rack 1314b from, and project its upper rack 1312b into, the magazine 1066. Counterclockwise rotation of the bell crank 1324 is also effective, through interponent 1328, to swing the arm 1330 of spindle 1302 and hence the opposite pinion 1298 in clockwise direction as viewed in said FIGS. 12 and 13, which retracts the lower rack 1314a of pinion 1298 while projecting the upper rack 1312a thereof into the magazine 1066. Thus, the lowermost carton in the magazine chute which was firmly supported upon the lower racks 1314a and 1314b is deprived of support and drops onto the conveyor belt 1230 underneath, while the upper racks 1312a and 1312b move inwards, and prevent the next higher carton from following suit. As will be seen from FIGS. 5 and 7, the described release mechanism is disposed sufficiently high above the upper run 1231 of the carton supply conveyor to permit a carton dropping from the magazine onto said conveyor with its lid in upwardly unfolded condition to clear the next higher carton that is retained upon the upper racks 1312a and 1312b. As soon as the solenoid 1294 is de-energized, however, the upper racks are withdrawn while the lower racks return to their inwardly projected position. Hence, the whole stack of superposed cartons in the magazine drops by a distance equal to the vertical distance between the upper and lower racks and comes to rest with its lowermost carton upon the inwardly projected ends of the lower racks.

When a carton has been dropped in the described manner upon the upper run 1231 of the continuously operating conveyor belt 1230, said belt carries it against a pair of stops 1332a and 1332b that are arranged to arrest advance of the carton on the belt in a position wherein its foremost transverse row lies directly below the path of the egg collecting carriage 1070. Means are provided in accordance with the invention that disable said stops after the carriage has delivered its eggs into the first pocket row of the carton arrested thereby and as it commences to return to its initial egg receiving position, whereupon the carton may proceed on conveyor 1230 until it comes against another similar set of stops that aligns its second row of pockets below the path of the egg collecting carriage. In fact, along the upper run 1231 of the carton feed conveyor there are provided as many sets of stops 1332a and 1332b as there are transverse pocket rows in the maximum sized carton or cardboard grid that is to be handled by the packing mechanism of the invention, and the arrangement is such that depending upon the actual number of pocket rows comprised in a particular carton or cardboard grid to be filled with eggs, any unnecessary sets of stops may effectively be disabled prior to commencement of the carton filling operation. Having reference to FIG. 6, the horizontal panel 1246 of the channel structure 1244 which supports the conveyor belt is provided with longitudinal slots 1334a and 1334b at either side of the upper run 1231 of said belt. Through said slots may project six sets of transversely aligned stop bars 1332a and 1332b corresponding to the six rows of egg pockets provided in the hereinbefore described cardboard grids 103. Said pairs of stop bars are spaced apart in a direction longitudinally of the conveyor belt by a distance equal to the width of the individual pocket rows.

Each two transversely aligned stop bars 1332a and 1332b rise from mounting blocks 1336a and 1336b, respectively, that are firmly secured to a common transverse spindle 1338 which is rotatably supported in a pair of bearing blocks 1340 (FIGS. 7 and 9). The bearing blocks 1340 of all the six spindles 1338 comprised in the carton control mechanism of the invention are secured to the longitudinal edges of a shield 1342 that is suitably supported from the underside of the hereinbefore described horizontal panel 1246 of the channel structure 1244. Said shield is arranged to support the lower or return run 1343 of said belt 1230 which may be guided to and from the level of said shield by a pair of idler rollers 1344 and 1346 that are rotatably supported from the side panels 1240 and 1242 of structure 1244 adjacent the end edges of the shield 1342 as best shown in FIG. 7. Counterweights 1348 secured to the spindles 1338 yieldably urge said spindles into an extreme clockwise position as viewed in FIGS. 7 and 8 which is determined by contact of stop studs 1350 secured to the spindles 1338 with the underside of the shield 1342 and wherein the stop bars 1332a and 1332b project vertically through the elongated slots 1334a and 1334b above the level of the horizontal panel 1246 into carton blocking position.

To prevent the stop bars 1332a and 1332b from yielding against the urgency of the counterweights 1348 under the force of a carton carried against them by the continuously operating conveyor belt 1230, one of the stop bars in each set projects below its mounting block 1336b to form a tail 1352 that is engaged by a latch dog 1354 (FIGS. 9 and 10). Each of said latch dogs is pivotally supported from the walls of a channel 1355 provided in the upper face of a mounting block 1356, and is held in a raised tail-blocking position by suitable spring means 1358 interposed between its head 1360 and the floor of channel 1355. The mounting blocks 1356 of all the six latch dogs 1354 comprised in the illustrated embodiment of the carton positioning mechanism are firmly mounted upon a common shaft 1362 that extends longitudinally along and below the horizontal panel 1246 of channel structure 1244 and which may be rotatably supported from the side panel 1240 of said channel structure by suitable bearing gussets 1364 (FIGS. 9 and 10).

Means are provided to turn the shaft 1362 through an arc sufficient to move the heads 1360 of the latch dogs 1354 sideways clear of the tails 1352 of their respective stop bars whenever the egg collecting carriage 1070 returns to its initial egg receiving position, so that a set of stop bars against which a filled or partially filled carton or cardboard grid may bear at the moment, is free to yield and may swing on its spindle 1338 below the level of the horizontal panel 1246. This permits a carton to proceed under the force of the continuously moving belt 1230 until it comes against the next set of stop bars, the arrangement being such that by this time the shaft 1362 has returned to its initial position wherein the latch dog 1354 associated with the next set of stop bars maintains said next stop bars in carton-blocking position. For this purpose, the shaft 1362 is yieldably held in its stop bar latching position by a spring 1366 tensioned between one end of a stud 1368 that projects radially from shaft 1362 and a stud 1370 that projects downwardly from the shield 1342, with the oppositely projecting end of said first mentioned stud 1368 bearing against a position determining stop ledge 1372 that may be formed by an inwardly turned flange of the side panel 1340 of channel structure 1244 (FIG. 9).

To rock the shaft 1362 out of the defined stop-bar-latching position, it carries an arm 1374 whose pointed end 1376 is engaged by a jaw 1378 which is pivotally supported in the buffer-shaped head 1380 of the normally projected armature 1382 of a solenoid 1384. Said solenoid 1384 may be supported in any suitable manner from the shield 1342, such as by means of the aforementioned stud 1370, and is of a construction similar to a solenoid which controls the operation of the egg accumulating units 130 described in detail in my aforementioned copending application. Whenever the solenoid 1384 is energized, its jaw 1378 pulls the arm 1374 in counterclockwise direction as viewed in FIG. 8 which swings the shaft 1362 against the urgency of spring 1366 into a rotary position wherein the latch dogs 1354 clear the tails 1352 of their respective stop bars. As the armature 1382 of solenoid 1384 reaches its fully retracted position, however, contact of a foot 1386 formed on the jaw 1378 with a stationary member 1388 swings said jaw in counterclockwise direction and disengages it from the pointed end 1376 of the arm 1374. As a result thereof, the shaft 1362 may immediately return to its initial stop-bar-latching position under the urgency of the restore spring 1366 so that a carton advancing over a yielding set of stop bars will be positively blocked from further advance as it comes against the next set of stop bars. Upon de-energization of solenoid 1384 its armature 1382 returns to its projected position wherein its yieldable jaw 1378 is again engaged behind the pointed end 1376 of arm 1374 under the urgency of spring means 1390 interposed between the jaw and the buffer-shaped head 1380 of the armature 1382.

The described filling mechanism may be conditioned for operation with two-row cartons or six-row cardboard grids by setting a manually operable switch 1392 to either connect the solenoid 1270 or the solenoid 1294 to the power circuit of the stop bar control solenoid 1384. In the diagram shown in FIG. 13, said switch has been set to connect the solenoid 1294 of the carton magazine 1066 into the circuit of the stop bar control solenoid 1384 so that the described carton filling mechanism may operate with two row cartons 910. In such a case, it is necessary that all but the first two sets of stop bars 1332a and 1332b be turned below the level of the horizontal panel 1246 of channel structure 1244 and are held in this position by a cover plate 1394 that may be clamped over one of the side panels of said structure 1244 as shown in FIG. 7. The first carton may then be placed manually against the first of the two effective sets of stop bars 1332a and 1332b and operation of the egg collecting carriage 1070 may be initiated. As soon as the carriage begins its intermittent advance toward and across the conveyor belt 1230, it releases the switch arm 1216 permitting it to return to its normal position wherein it closes the disabling switch 1218 for the carriage return solenoid 1108 so that the control circuit of said solenoid is conditioned for immediate operation upon closure of the hammer-actuated switch 1200. After the carriage has received its full load of eggs, has moved fully above the first row of the carton on the conveyor belt 1230 and has discharged its load into said row of pockets, switch 1200 is closed by linkage (not shown) which is effective to energize the solenoid 1108 and return the carriage to its initial location as previously described. Return of the carriage 1070 to its initial position actuates switch arm 1216 to open the hereinbefore mentioned switch 1218 in the power circuit of control relay 1206, and de-energization of said relay breaks the power circuit of the carriage-returning solenoid 1108. Actuation of the same switch arm 1216 has the additional effect of closing another switch 1396 that lies in a common branch of the power circuits of the stop-bar-control solenoid 1384 and the carton-magazine-control solenoid 1294. Closure of switch 1396 is effective to energize the stop bar control solenoid 1384 but is ineffective to operate the release solenoid 1294 of the carton magazine 1066 because of the presence of a normally open switch 1398 in the power circuit of the carton magazine control solenoid 1294. Said switch 1398 may be supported from the shield 1342 adjacent the second one of the stop bar supporting spindles 1338 with its actuating arm 1399 disposed below and within the rotary orbit of the rotation limiting stud 1350 of said spindle. Energization of the stop bar control solenoid 1384 withdraws support from the first pair of stop bars 1332a and 1332b so that the carton under the force of the continuously operating conveyor belt 1230 forces them backwards and rides over them until it comes against a second set of stop bars which have been re-latched in effective upright position by the time the carton reaches them as descrbied hereinbefore. The carton with its first row filled is now positioned upon the horizontal panel 1246 of the channel structure 1244 with its second and still empty row of pockets aligned directly below the path of the egg collecting carriage 1070 and said carriage commences another operational cycle in the manner previously described. This again permits return of switch arm 1216 to its normal position wherein it closes switch 1218 and thus reconditions the carriage-return solenoid 1108 for immediate operation upon discharge of the second row of eggs into the second pocket row of the carton on feed conveyor 1230. In addition, the return of the switch arm 1216 to its normal position breaks the power circuit of the stop-bar-control solenoid 1284 permitting re-engagement of its jaw 1378 with the arm 1374 of the latch supporting shaft 1362 and thus conditions the latch-release mechanism for renewed operation. After the carriage has discharged another load of eggs into the second pocket row of the carton and has again returned to its initial position, the resultant closure of switch 1396 effects release of the second set of stop bars 1332a and 1332b and the continuously operating belt may now carry the filled carton over said bars and over the hereinbefore mentioned cover plate 1394 that disables the remaining stop bars and finally over a downwardly slanting feed lip 1400 onto the hereinbefore mentioned take-off conveyor 134.

As the filled carton forces the second set of stop bars out of its way and the spindle 1338 from which said stop bars are supported is turned in counterclockwise direction, as viewed in FIG. 9, the rotation limiting stop stud 1350 of said spindle depresses the actuating arm 1399 of switch 1398 and closes said switch. As a result thereof, the power circuit through the release solenoid 1294 of the carton magazine 1066 is now completed and said solenoid is energized, which is effective to drop a fresh carton onto the conveyor belt 1230 in the manner described hereinbefore, while the counterweights 1352 attached to the spindles 1338 of the depressed stop bars return said stop bars to the upright position as soon as the filled cartons have passed over them. When the stop bars are returned to their upright position in this manner, their tails 1352 ride over the backs of their respective latch dogs 1354 and depress said latch dogs against the urgency of spring means 1358 (FIG. 10) until they have passed over the heads 1360 thereof whereupon said spring means raise them into latching position behind said tails (FIG. 10).

The alternative circuit through the solenoid 1270 of the release mechanism 1254 for the magazine 1068 filled with base plates 1060 and cardboard grids 103 as established by appropriate manipulation of the switch 1392, contains likewise a normally open switch 1406 that prevents energization of said release mechanism until a cardboard grid deposited onto the conveyor belt 1230 has been filled with eggs to its last row and passes over the last pair of stop bars 1332a and 1332b onto the take-off conveyor 134. Said switch 1406 is likewise supported from the shield 1342 near the last of the stop bar supporting spindles 1338 with its actuating arm 1407 disposed below and within the rotary orbit of the rotation-limiting stop stud 1350 provided on said last spindle so that it will be closed by said stop stud whenever the discharge of a filled cardboard grid pushes the last pair of stop bars 1332a and 1322b out of its way. With said switch 1406 closed, return of the carriage 1070 to its initial position with resultant closure of switch 1396 will effect power flow through the solenoid 1270 and cause discharge of a new base plate 1060 with a cardboard grid 103 resting thereon onto the carton feed conveyor 1064 which delivers them against the first pair of stop bars 1332a and 1332b so that the egg collecting carriage may fill its first row of pockets during the next operation cycle of the machine.

While I have described my invention with the aid of a preferred embodiment, it will be understood that the constructional details described and shown in the accompanying drawings may be departed from without departing from the scope and spirit of my invention.

Also while the machine of the invention as illustrated in the accompanying drawings and as described in the specification was specifically devised, and is employed for processing eggs, it will be understood that a machine embodying the principles of the invention may also be usefully employed with other articles, such as avacados or other highly priced fruit.

I claim:
1. A feed mechanism for containers of the type wherein a grid is superposed on a base plate and wherein the ends of the grid partitions project a limited distance beyond the outer walls of the grid, said mechanism comprising a magazine adapted to hold a stack of the containers and having an open lower discharge end, a conveyor disposed below said magazine, drive means for said conveyor, a pair of substantially horizontally disposed shelves projecting part way across the open lower end of said magazine from opposite sides thereof and having recesses formed in their inner edges corresponding with and adapted to receive the projecting ends of the grid partitions while the tongue formed between said recesses protrude inwardly under the periphery of the base plates in said magazine, and means operable to consecutively swing said shelves downwardly to a position wherein said tongues move clear of and permit the stack of containers to drop upon the conveyor and to then swing said shelves upwardly to move said tongues past the lowermost grid in this stack and into engagement with the bast plate thereabove to lift the stack upwardly, the recesses in said shelves being adapted to receive the partition ends during upward movement of the shelves.

2. A feed mechanism for dropping containers onto a support surface, said containers being of the type wherein a grid is superposed on a base plate and wherein the ends of the grid partitions project a limited distance beyond the outer walls of the grid, said mechanism comprising a magazine having vertical walls and being open at its lower end, said magazine being adapted to support a stack of superposed containers above the support surface with the end surfaces of the grid partitions disposed in sliding guided engagement with the interior surfaces of said magazine walls, a pair of shelves mounted beneath two opposed walls of said magazine for pivotal movement between an upper intercepting position projecting part way across the open lower end of said magazine and a position withdrawn from said intercepting lower position, said shelves having recesses formed in their inner edges, each recess being spaced from an adjacent wall of said magazine a distance equal to the distance one of the projecting ends of said grid partitions is spaced from said adjacent side wall whereby said one projecting end will pass through the associated recess when the shelf is moved upwardly to said intercepting position, the tongues defined on said shelves between said recesses being arranged to extend to a position under the periphery of the base plates in the magazine when said shelves are in said intercepting position, and means operable to consecutively swing said shelves downwardly to a position wherein said tongues move clear of and permit the stack of containers to drop upon the support surface and to swing said shelves upwardly to move said tongues past the lowermost grid and into engagement with the base plate thereabove to lift the stack upwardly, the recesses in said shelves being adapted to receive the partition ends during upward movement of said shelves.

References Cited in the file of this patent

UNITED STATES PATENTS

| | | |
|---|---|---|
| 1,210,520 | Oliver | Jan. 2, 1917 |
| 1,314,852 | Burdine | Sept. 2, 1919 |
| 1,330,639 | Leumann | Feb. 10, 1920 |
| 1,649,365 | Poling et al. | Nov. 15, 1927 |
| 1,690,920 | Bergmann | Nov. 6, 1928 |
| 1,855,441 | Crouse | Apr. 26, 1932 |
| 1,985,518 | Royden | Dec. 25, 1934 |
| 2,087,539 | Greene | July 20, 1937 |
| 2,419,351 | Glassner | Apr. 20, 1947 |
| 2,651,723 | Berger | July 24, 1951 |
| 2,629,503 | Neja | Feb. 24, 1953 |
| 2,668,627 | Wetzler | Feb. 9, 1954 |